US006431666B2

(12) United States Patent
Courtemanche

(10) Patent No.: US 6,431,666 B2
(45) Date of Patent: Aug. 13, 2002

(54) SNOWMOBILE TRACK WITH HEAT TRANSFER CLIPS

(75) Inventor: Denis Courtemanche, Richmond (CA)

(73) Assignee: Camoplast Inc. (CA)

(*) Notice: Subject to any disclaimer, the term of this patent is extended or adjusted under 35 U.S.C. 154(b) by 0 days.

(21) Appl. No.: 09/790,474

(22) Filed: Feb. 22, 2001

(51) Int. Cl.[7] ................................................ B62D 55/00
(52) U.S. Cl. ....................................... 305/168; 305/165
(58) Field of Search ................................ 305/168, 165, 305/167, 127

(56) References Cited

U.S. PATENT DOCUMENTS

| | | | | | |
|---|---|---|---|---|---|
| 3,205,023 | A | * | 9/1965 | Nodwell | 305/168 |
| 3,690,741 | A | * | 9/1972 | Pierson | 305/168 |
| 3,756,668 | A | * | 9/1973 | Russ, Sr. | 305/168 |
| 4,023,865 | A | * | 5/1977 | Morissette | 305/168 |
| 4,059,315 | A | * | 11/1977 | Jolliffe et al. | 305/168 |
| 4,217,006 | A | * | 8/1980 | Dehnert | 305/168 |
| 4,474,414 | A | * | 10/1984 | Tokue | 305/168 |
| 4,560,211 | A | * | 12/1985 | Van Der Lely | 305/168 |
| 4,758,055 | A | | 7/1988 | Anderson | 305/35 |
| 4,991,911 | A | * | 2/1991 | Blais | 305/168 |
| 5,033,801 | A | * | 7/1991 | Beeley | 305/168 |
| 5,058,963 | A | * | 10/1991 | Wiesner et al. | 305/168 |
| 5,415,470 | A | * | 5/1995 | Courtemanche | 305/168 |
| 5,573,316 | A | | 11/1996 | Wankowski | 305/180 |
| 5,676,437 | A | * | 10/1997 | Holmgren et al. | 305/165 |
| 5,685,621 | A | | 11/1997 | Nugent | 305/180 |
| 5,713,645 | A | * | 2/1998 | Thompson et al. | 305/168 |
| 5,755,495 | A | * | 5/1998 | Cook et al. | 305/168 |
| 5,814,167 | A | * | 9/1998 | Beaudoin | 305/168 |
| 5,921,642 | A | | 7/1999 | Tschida | 305/180 |
| 6,196,646 | B1 | * | 3/2001 | Edwards | 305/167 |

* cited by examiner

*Primary Examiner*—S. Joseph Morano
*Assistant Examiner*—Long Bao Nguyen
(74) *Attorney, Agent, or Firm*—Akerman Senterfitt

(57) ABSTRACT

Metallic clips are provided on the endless track of a snowmobile equipped with one or more elongated slide runners forming part of its suspension system. The clips are formed with a first portion adapted to be slidably and frictionally contacted by the slide runners during rotation of the track and with a second portion extending slightly above profiles integrally formed on the outer surface of the track so that heat generated as a result of the sliding friction of the runners on the clips is transferred directly to the snow or ice over which the snowmobile travels so as to cool the clips.

8 Claims, 6 Drawing Sheets

114
112
170
161
116
162
172
118
7
7

172
162
158
164
152
161
170
8
8
150
182
188
156
124
180

172
166
152
164
160
158
170
168
184
182
150
188
186
124
156
180

SNOWMOBILE TRACK WITH HEAT TRANSFER CLIPS

FIELD OF THE INVENTION

The present invention pertains to an endless track for use on a snowmobile equipped with a suspension system having elongated slide runners which bear on the inner face of the lower run of the track. More particularly, the present invention relates to such tracks having metallic clips that provide a bearing contact for the slide runners on the track.

BACKGROUND OF THE INVENTION

Many snowmobile tracks are presently equipped with metallic clips which are located in one or more rows of longitudinally spaced openings provided along the endless track. The purpose of these clips is to provide a sliding surface for the slide runners that bear on the inner face of the lower run on the track. The highly rotational drive of the track causes extreme heat to be generated on the contacting surfaces of the slide runners and of the clips. This heat is transferred to the rubber material of the track onto which the metallic elements are clipped, greatly affecting its structure. In some cases, the heat will cause the runners to be bound to the clips.

In tracks having one or more rows of openings, there is a cooling effect obtained by the presence of snow or ice in these holes in which extend opposite wing portions of the clips. However, this cooling has been found to be greatly insufficient and the above described heat problems still exist.

OBJECTS AND STATEMENT OF THE INVENTION

It is an object of the present invention to provide, on an endless track of a snowmobile of the kind having slide runners forming part of the suspension system, a series of metallic clips which establish a direct contact between the slide runners and the snow or ice over which the snowmobile travels so that the heat generated by the sliding friction of the slide runners on the metallic clips may be thermally transferred directly to the snow or ice, which is obviously at a much lower temperature than that of the heat generated by the sliding friction.

The present invention therefore relates to a track for use on a snowmobile having a suspension system equipped with one or more elongated slide runners, the track comprising an endless body having an outer surface with transverse rows of ground engaging profiles, spaced longitudinally of the track, and an inner surface adapted to receive, on the lower run thereof, the slide runners of the suspension system. The track includes one or more rows of longitudinally spaced metal clips that are secured to the body of the track; each clip has a first flat portion extending substantially in the plane of the inner surface of the track and so disposed thereon as to be frictionally contacted by a slide runner, and a second portion extending above the outer surface of the track so as to contact the ground over which the snowmobile travels whereby heat generated by the frictional sliding contact of the slide runner on the first portion of the clip is thermally transferred to the ground, being at a temperature lower than that of the heat generated by the frictional sliding contact of the slide runners on the clips.

In one form of the invention, each clip is formed of a slide contacting first part that includes the first flat portion and of a ground engaging second part that includes the second portion. Each first part has hook ends engaging corresponding hook ends on the second part to inter-engage these parts to one another.

In another form of the invention, each clip is formed of a single body with the second portion being formed of a bottom wall that includes the first portion and of folded side and top walls that define the second portion.

In another form of the invention, the second portion of the clip includes pointed studs that extend beyond a plane that includes the top edges of the profiles of the track.

In another form of the invention, the pointed studs are integrally formed to a top face of the second portion.

In a further form of the invention, the pointed studs are securely fixed to top walls of the second portion of the clip.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF THE PREFERRED EMBODIMENTS

Figure 1:
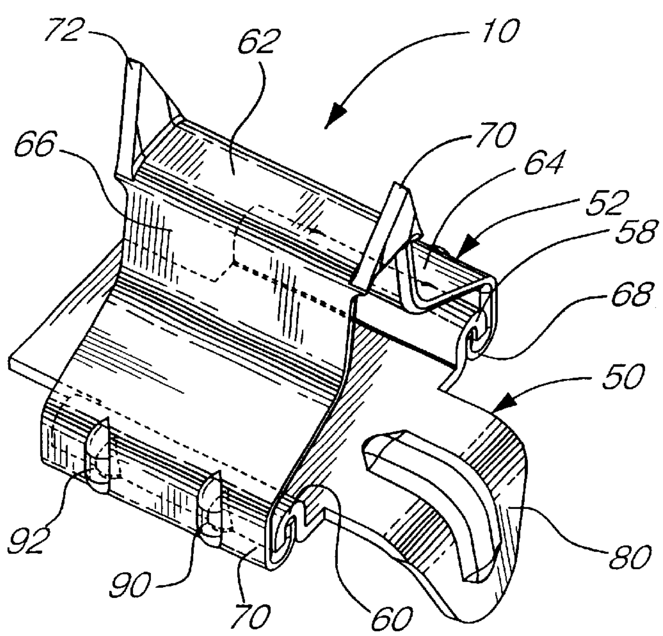
FIG. 1 is a perspective view of a clip made in accordance with the present invention.
Figure 2:
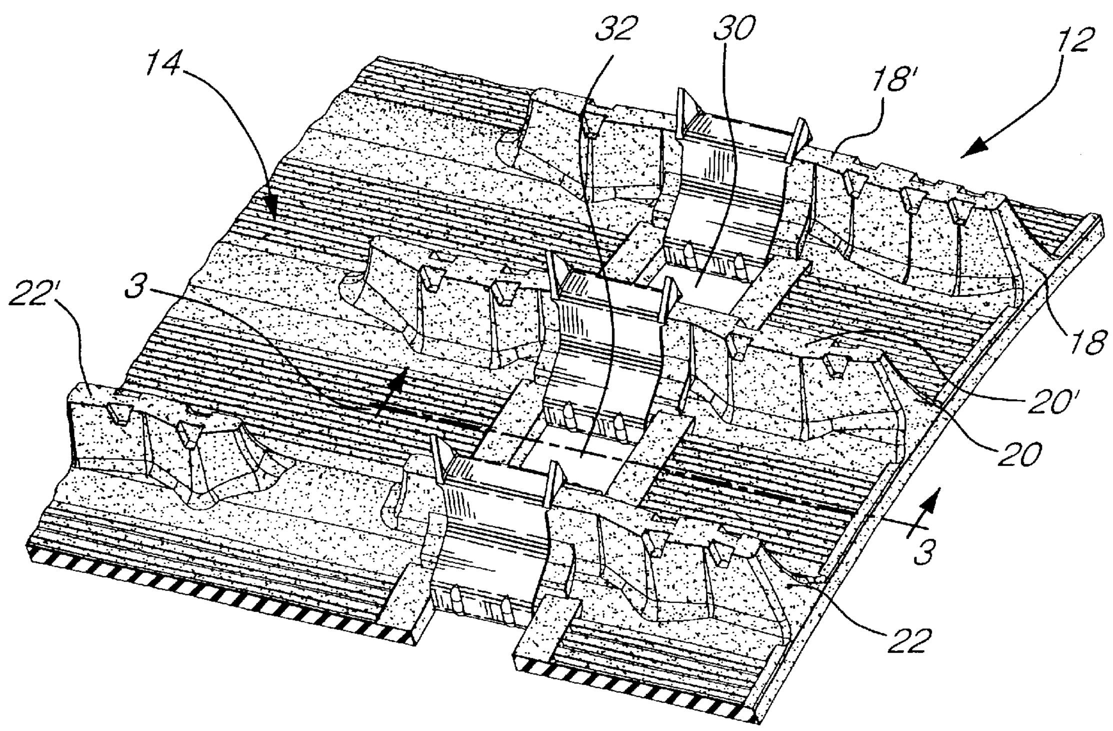
FIG. 2 is a top perspective view showing part of a snowmobile track equipped with clips such as shown in FIG. 1.

Referring to FIGS. 1 and 2, there is shown a metallic element in the form of a clip, generally denoted 10, which is shaped to form part of a snowmobile endless track, generally denoted 12, made in accordance with the present invention.

Figure 3:
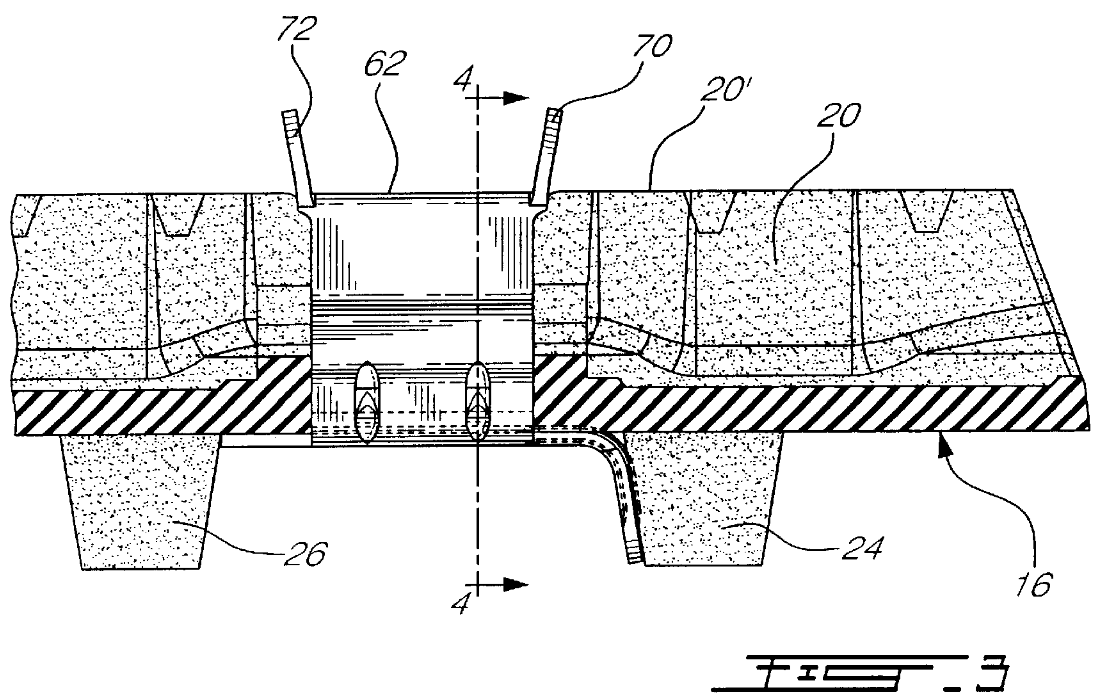
FIG. 3 is a cross-sectional view taken along line 3—3 of FIG. 2.
Figure 4:
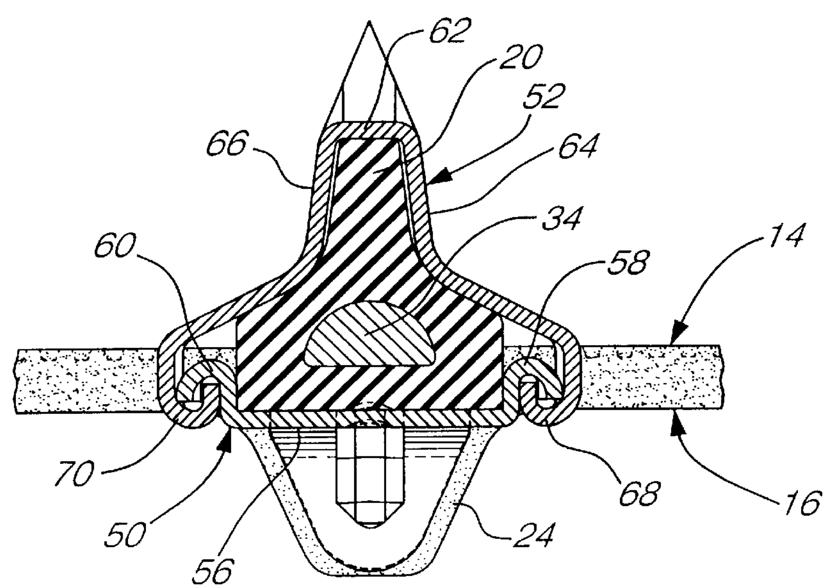
FIG. 4 is a cross-sectional view taken along line 4—4 of FIG. 3.

Referring also to FIGS. 3 and 4, the snowmobile track 12 comprises an outer surface 14 and an inner surface 16. The outer surface comprises a series of transverse rows, (three being shown as 18, 20 and 22) which are longitudinally spaced along the endless track. The profiles have different forms to provide ground traction to the track when driven by the transmission system of a snowmobile (not shown).

The inner face 16 of the track comprises a series of lugs, such as those illustrated as 24 and 26, which are adapted to be contacted by drive sprockets (not shown) forming part of the driving system of the snowmobile.

The suspension system of a snowmobile usually consists of a pair of longitudinal slide runners that bear on the lower run of the inner face 16 of the snowmobile track. They are usually located over areas of the track where a series of openings, such as 30 and 32, are provided.

On most snowmobile tracks, the metallic elements are clipped onto the rubber material that form part of the profiles. In some tracks, the clips are present at every second, third or more profile. Reinforcing rods 34 usually extends transversally of the track within the profiles. The construction of a snowmobile track is well known and a detailed description of its method of manufacturing needs not be described. It should be mentioned however that, in a co-pending U.S. application of applicant, filed Jan. 10, 2000 under Ser. No. 09/480,152 a new method of making a snowmobile track is described where the metallic elements are not clipped on the tracks after the track is vulcanized and cured, but where they are integrally formed to the track prior to the vulcanizing and curing steps.

In all known snowmobile tracks, the metallic elements, whether clipped or integrally formed, have a portion extending near the plane of the inner surface of the track and opposite wing portions extending in the opening of the back that are clipped or integral with opposite sides of the profiles; however, they terminate short of the top edge thereof. The slide runners bear and slide along the outer face of the portions of the metallic elements that lie near the plane of the inner surface of the track. During operation of the snowmobile, frictional heat is generated by the contacting surfaces of the clips and the runners.

The present invention is concerned with means for dissipating this heat from the slide runners to the ground, such as snow or ice, over which the snowmobile travels.

The embodiment 10 illustrated in FIG. 1 consists of a two-part clip which achieves the intended purpose of the present invention; thus, the clip 10 comprises a lower part 50 and an upper part 52 (the terms "lower" and "upper" are used for the parts as they are seen in the drawings). As can be seen in FIG. 4, the lower part 50 comprises a flat horizontal portion 56 and a pair of opposite hook ends 58 and 60.

The upper part 52 comprises a top face 62 that lies over the top edge of the profile 20 and opposite side portions 64 and 66 which follow generally the contour of the profile and which display lower hook ends 68 and 70. The latter are shaped to lockingly engage with the hook ends 58 and 60 of the lower part 50 of the clip. The top portion 62 has opposite triangular shaped pointed ends 70 and 72 forming studs which extend beyond a plane that extends through the top edges 18', 20' and 22' of the profiles 18, 20 and 22.

The lower part 50 has a downwardly curved end portion 80 which is adapted to bear against the side face of a lug 24 on the inner surface of the track.

Both parts 50 and 52 have, on opposite sides thereof, one or more bosses 90, 92 that fittedly engage one another to further secure the inter-engagement of the two parts when hooked to one another.

Referring to FIG. 4, it can be seen that the heat generated by the frictional contact of a slide runner on surface 56 of the lower part 50 of the clip will be thermally transferred to the upper clip part 52 and to its pointed ends 70, 72 which will contact the ice or snow whereby the clips will be cooled.

Figure 5:
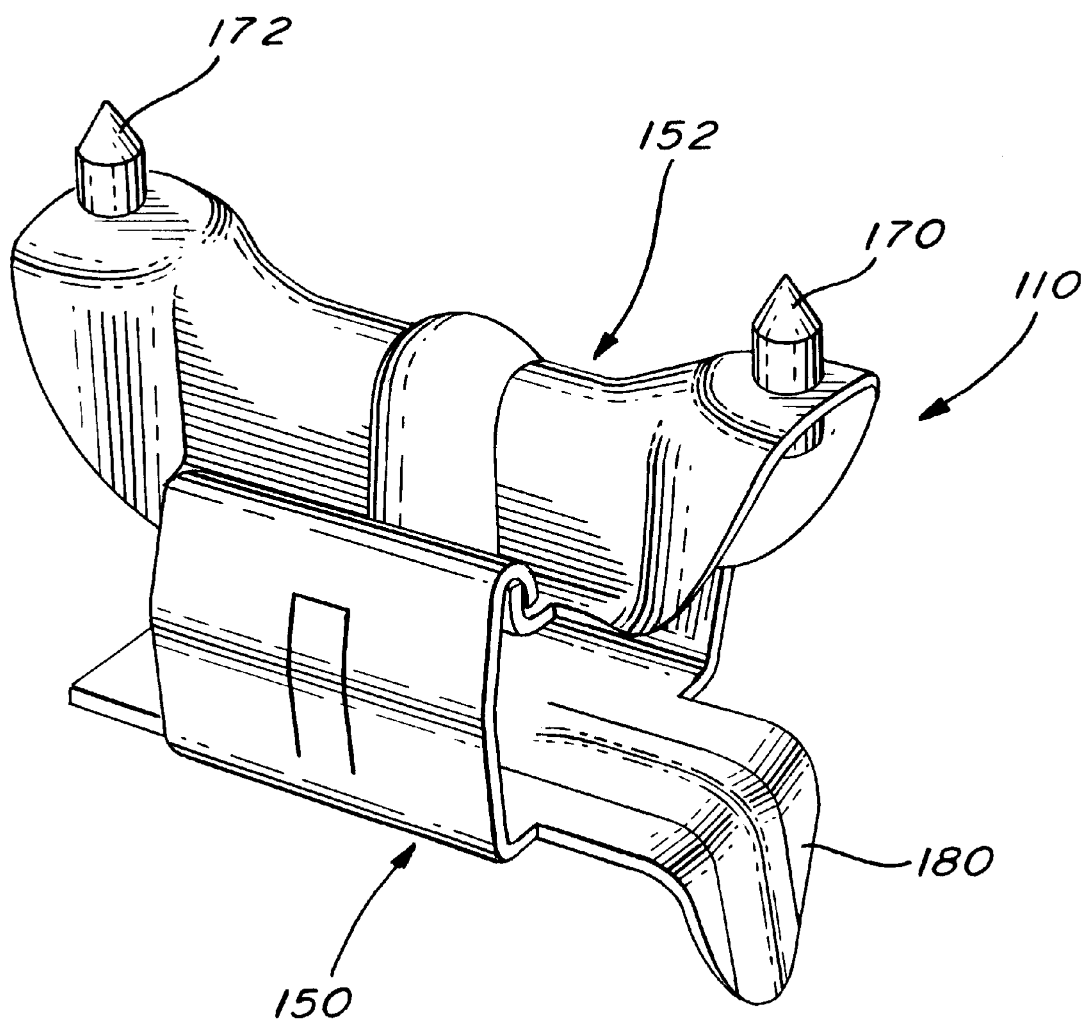
FIG. 5 is a perspective view of another embodiment of a clip made in accordance with the present invention.
Figure 6:
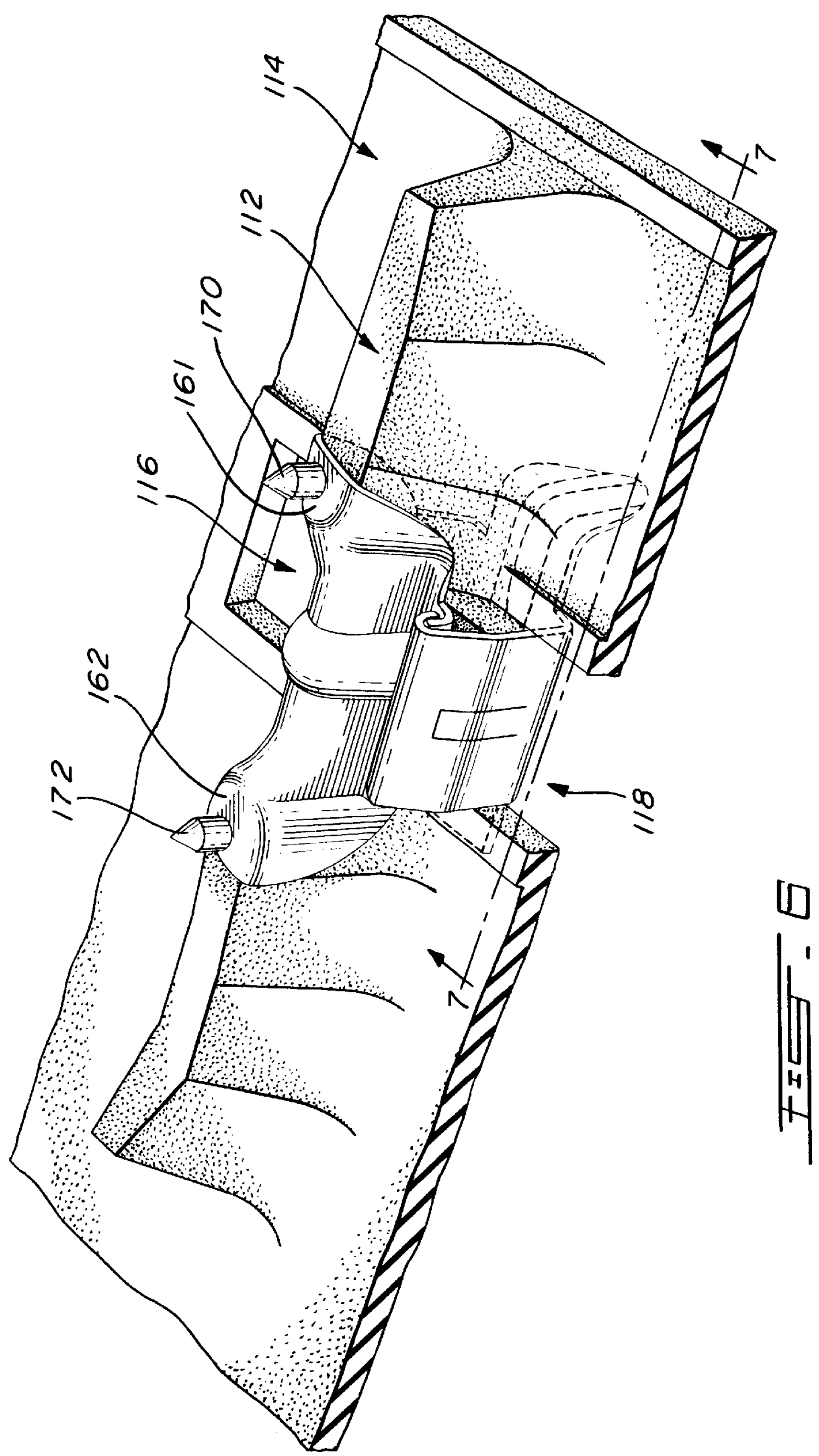
FIG. 6 is a top perspective view showing the clip of FIG. 5 mounted on a snowmobile track shown in part.

The embodiment 110 illustrated in FIG. 5 also consists of a two-part clip including a lower part 150 and an upper part 152. Referring also to FIG. 6, the clip 110 is provided on a profile portion 112 of a snowmobile track 114 between two longitudinally spaced opening 116 and 118 in the manner shown.

Figure 7:
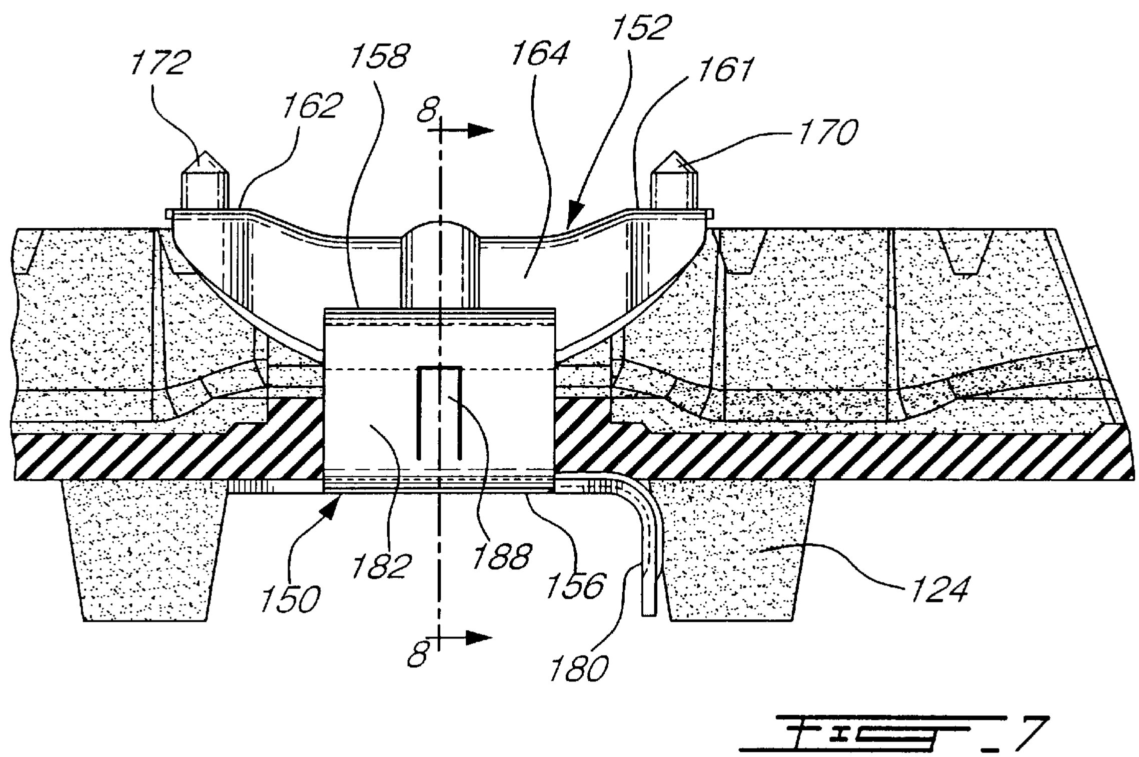
FIG. 7 is a cross sectional view taken along line 7—7 of FIG. 6.
Figure 8:
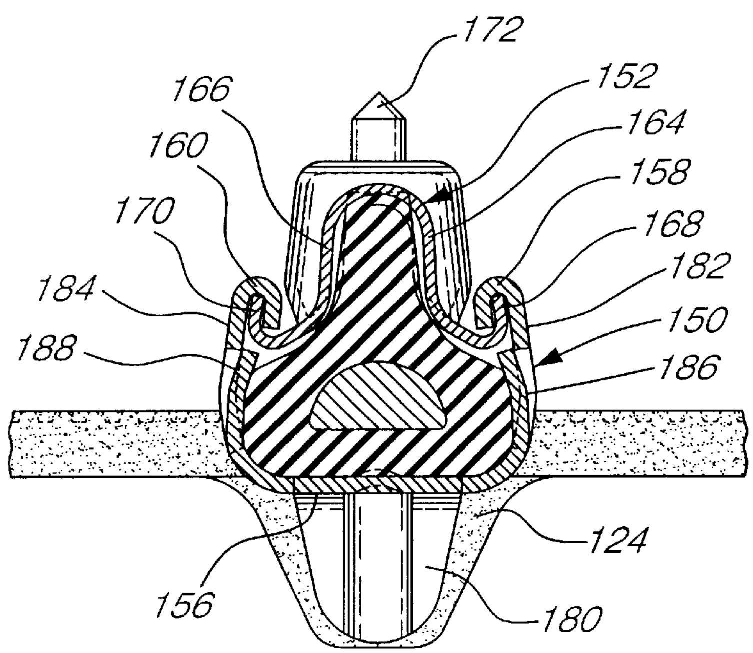
FIG. 8 is a cross sectional view taken along line 8—8 of FIG. 7.

Referring to FIGS. 7 and 8, the lower part 150 comprises a flat horizontal portion 156 and a pair of opposite hook ends 158 and 160. The part 152 comprises a pair of opposite faces 161, 162 that lye over the top edge of the profile portion 112 of the track. The upper part also includes opposite side portions 164, 166 which follow generally the contour of the profile and which display lower hook ends 168 and 170 respectively. The latter are shaped to lockingly engage with the hook ends 158 and 160 of the lower part 150 of the clip. The top faces 161 and 162 each display a pointed stud 170 and 172 which extend beyond a plane that includes the top edge of the profile section of the track.

The lower part 150 has a downwardly curved end portion 180 which is adapted to bear against the side face of a lug 124 on the inner surface of the track.

The lower part 150 has on its opposite side walls 182 and 184 deformable sections 186 and 188 which, when deformed inwardly as illustrated in FIG. 8, secure the inter-engagement of the lower part 150 with the upper part 152.

Again, in this embodiment, it can be seen that the heat generated by the frictional contact of a slide runner on the surface 156 of the lower part 150 of the clip will be thermally transferred to the upper clip part 152 and to its pointed studs 170 and 172 which will contact the ice or snow whereby the clips will be cooled.

Figure 9:
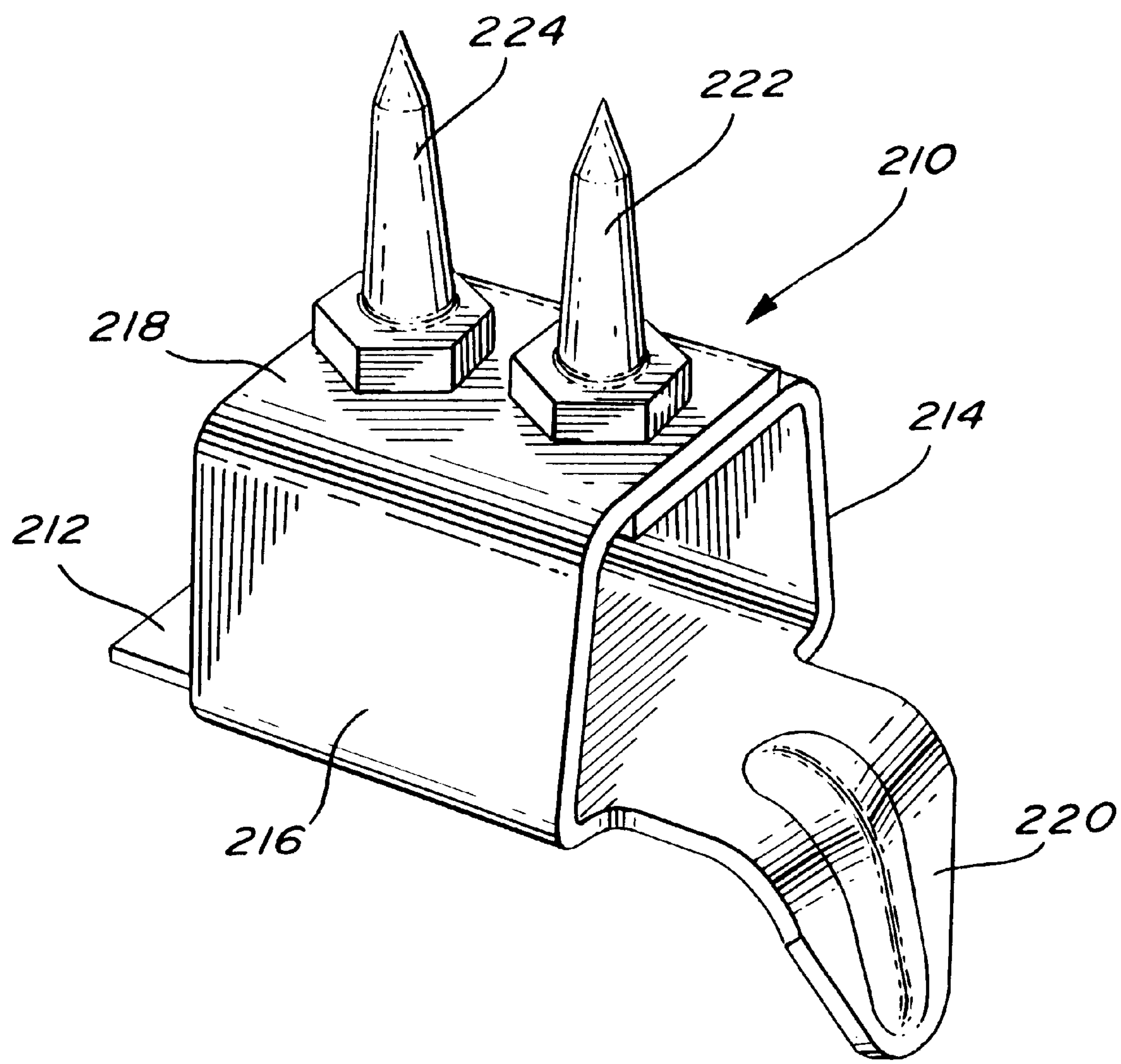
FIG. 9 is a perspective view showing another embodiment of a clip made in accordance with the present invention.

FIG. 9 shows another embodiment 210 of a clip made in accordance with the present invention; however, this clip is formed of a single body having a bottom wall 212, a pair of side walls 214, 216 which have their upper ends folded to define a two-layer top wall 218. The bottom wall 212 has an undersurface which is adapted to be contacted by the slide runner of a snowmobile and a curved end portion 220 to contact the lug of the track used for driving the track. In this embodiment, the clip is secured to the material of the track which extends within the walls 212, 214, 216 and 218. A pair of pointed studs 222 and 224 are fixedly secured to the top wall 218 of the clip to contact the snow or ice over which the snowmobile travels and also to provide a traction.

Although the invention has been described in relation to three specific forms, it will be evident to the person skilled in the art that it may be modified and refined in various ways. It is therefore wished to have it understood that the present invention should not be limited in scope, except by the terms of the following claims.

I claim:

1. A track for use on a snowmobile having a suspension system equipped with one or more elongated slide runners, said track comprising:

an endless body having an outer surface with transverse ground engaging profiles spaced longitudinally thereof and an inner surface adapted to receive, on the lower run thereof, said slide runners of said suspension system;

said track including one or more rows of longitudinally spaced metal clips secured to said body of said track; and each said clip having a first flat portion extending substantially in the plane of said inner surface and so disposed thereon as to be frictionally contacted by said slide runner, and a second portion extending above said outer surface of said track so as to contact the ground over which said snowmobile travels;

wherein each said clip is formed of a slide contacting lower part including said first flat portion and of a ground engaging upper part including said second portion, said lower part having hook ends engaging corresponding hook ends on said upper part to inter-engage said parts to one another, whereby heat generated by frictional sliding contact of said slide runners on said first portion of said clip is thermally transferred to the ground being of a temperature lower than that of said heat generated by said frictional sliding contact of said slide runners on said clips.

2. A track as defined in claim 1, wherein said lower part comprises a deformable section to secure the inter-engagement of said parts to one another.

3. A track as defined in claim 1, wherein said lower and upper parts include thereon inter-engaging bosses to secure the inter-engagement of said parts to one another.

4. A track for use on a snowmobile having a suspension system equipped with one or more elongated slide runners, said track comprising:

an endless body having an outer surface with transverse ground engaging profiles spaced longitudinally thereof and an inner surface adapted to receive, on the lower run thereof, said slide runners of said suspension system;

said track including one or more rows of longitudinally spaced metal clips secured to said body of said track; and each said clip having a first flat portion extending substantially in the plane of said inner surface and so disposed thereon as to be frictionally contacted by said slide runner, and a second portion extending above said outer surface of said track so as to contact the ground over which said snowmobile travels;

wherein said second portion of said clip includes printed studs extending beyond a plane that includes top edges of the profiles of the track; said pointed studs adapted to penetrate the ground and to provide traction, wherein said pointed studs are integrally formed to a top face of said second portion of said clip, whereby heat generated by frictional sliding contact of said slide runners on said first portion of said clip is thermally transferred to the ground being of a temperature lower than that of said heat generated by said frictional sliding contact of said slide runners on said clips.

5. A track as defined in claim 1, wherein said pointed studs are securely fixed to top walls of said second portion of said clip.

6. A track as defined in claim 1, wherein each said clip is formed of a single body with said second portion being formed of a bottom wall including said first portion and of folded side and top walls defining said second portion.

7. A track as defined in claim 6, wherein said pointed studs are securely fixed to said folded top walls.

8. A track as defined in claim 1, wherein said clips are metallic elements engaging said profiles adjacent longitudinally spaced openings in said track.

* * * * *